Figure 1:
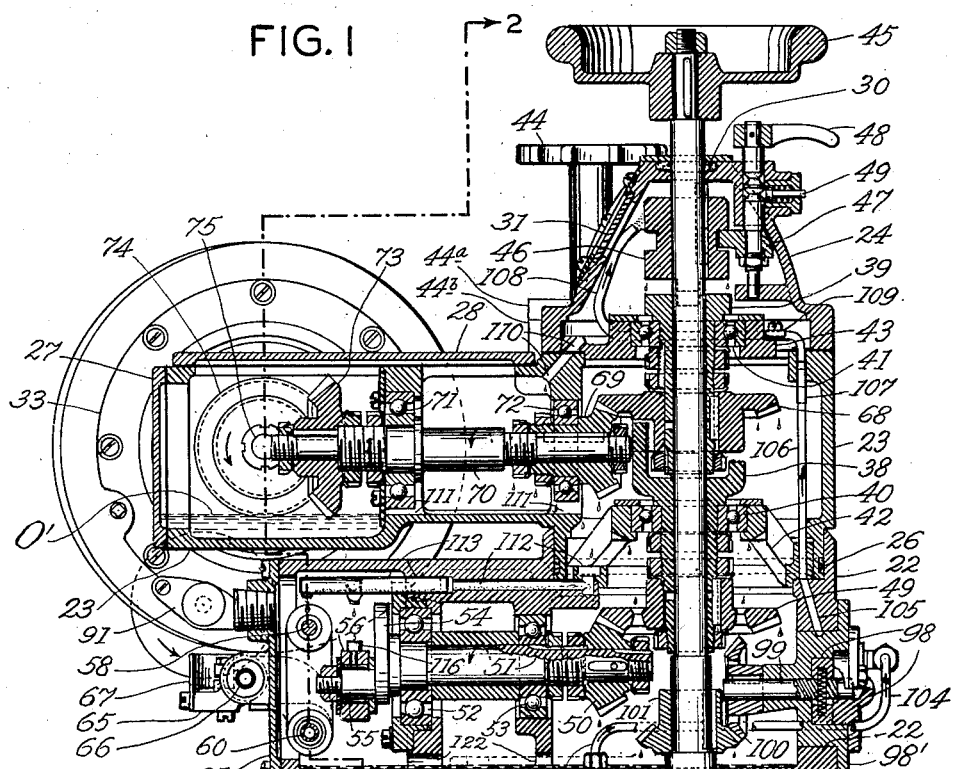

Feb. 26, 1935.  E. D. SMITH  1,992,722
CIGARETTE CUT-OFF
Filed April 20, 1934  2 Sheets-Sheet 1

INVENTOR
Elleron D. Smith
BY
Sydney Prescott
ATTORNEY

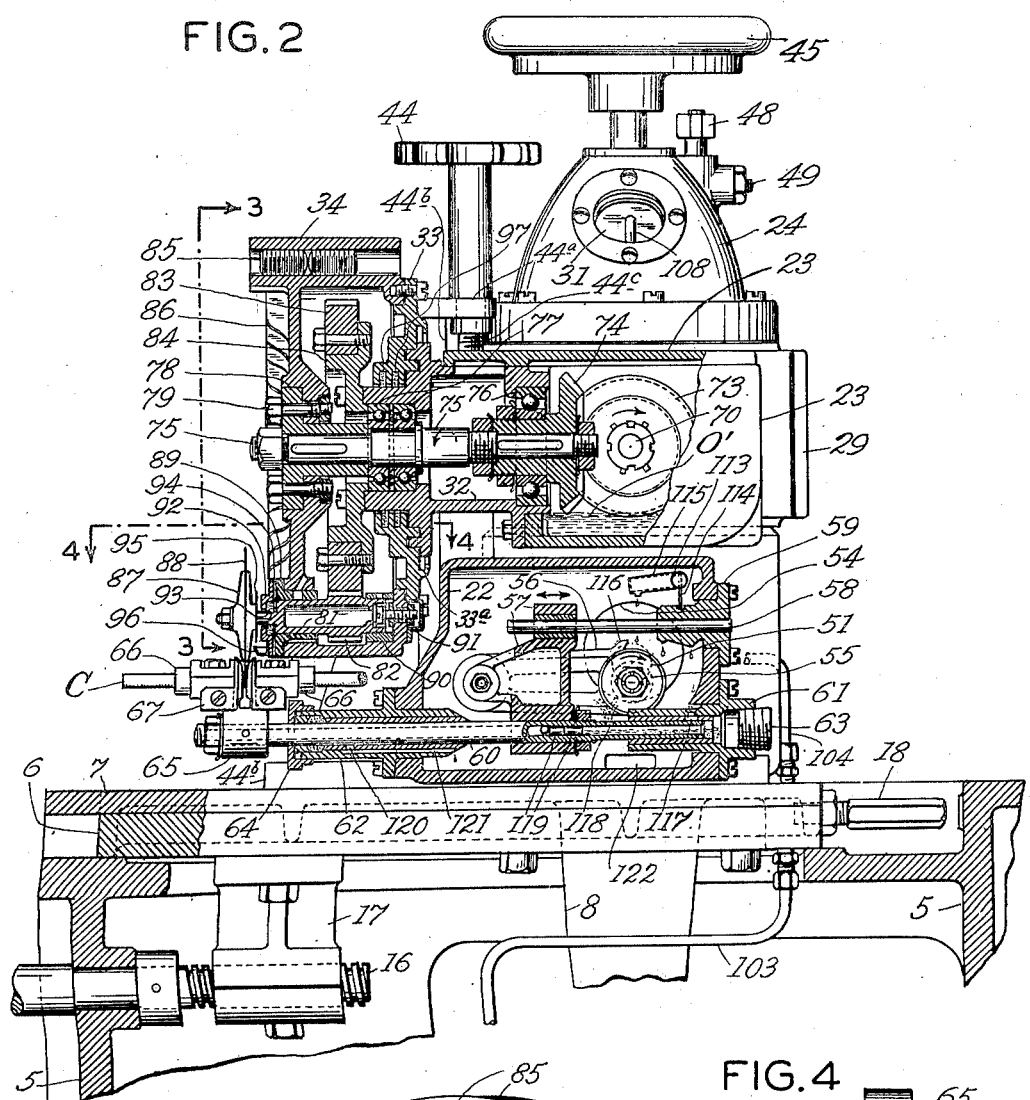

raises the oil O from the reservoir in housing 9 through pipes 103 and 104 into which it enters through a strainer 102, and forces it through a duct 105 in the wall of housing 22 into a pipe 106 which by a tube 107 pressed into a hole in housing 22 is slidably connected with a pipe 108 fastened by cleats 109 to bracket 43 and terminating near the top of clutch 46. From clutch 46, the oil runs down on sleeves 39 and 38 and also drips through ducts 110 into housing 23 wherein it forms an oil level O', into which dip the gears 73 and 74. The overflow drips through a channel 111 into a duct 112 in housing 22 and, through a pipe 113 inserted into this duct, reaches the forward end of housing 22, running down on a pin 114 supported by bearing 59. A branch 115 of pipe 114 carries oil to link 56 which scoops it up by means of a projecting lug 116 and forces it into a hole leading to the needle bushing on a stud 55.

The oil running down from bearing 59 on the forward stroke of hollow shaft 60 enters through an opening 117 into bearing 61 and on the return stroke is expelled through an opening 118 in shaft 60 which has plugs 119, thus splashing the moving parts of the ledger plate operating mechanism. The oil carried by shaft 60 into bearing 62 is returned into housing 22 through an opening 120 in the bushing of bearing 62 and through a groove 121 in the bearing. From the forward portion of housing 22 the oil returns through openings 122 in the supports of bearings 52 and 53. From housing 22 the oil runs down along shaft 12 and through a duct 123 in base member 8 returns to housing 9.

Figure 5:
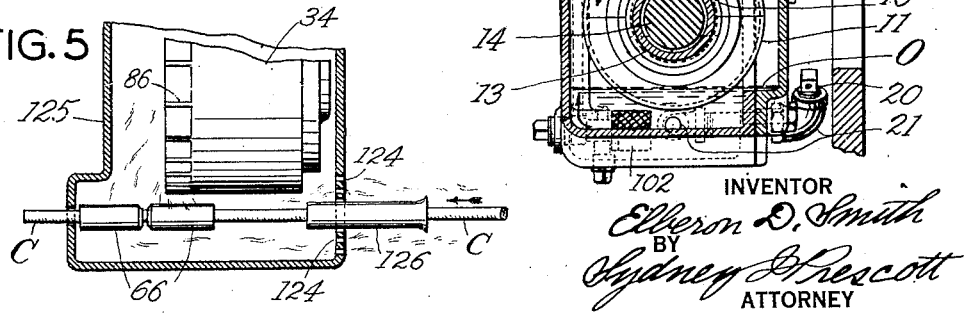

The current of warm air set up by the fins 86 is ejected through ports 124 in a guard 125 shown in Fig. 5, which surrounds the knife holder 34 and knife 88 for protection of the operator. These ports are so arranged as to direct the air current towards the oncoming cigarette rod C for the purpose of drying the paste in the seam of the same, and preventing sweating of the rod or condensation of moisture within the guide tube or bell mouth 126 leading from the sealer to the cutoff. The ledger tubes 66 are located directly under the fins 86 within the guard 125 and thus will also be heated, so that no moisture can form within them.

The operation of the several parts has been set forth in connection with the description of those parts. It is noted that great care has been taken in the designing of this cutoff, to eliminate unbalanced forces. The spindle knife and knife supporting parts must be accurately balanced on the opposite side of the axis. Hitherto every time the diametrically opposite weight of the carrier was changed to counterbalance these parts, the dynamic balance of the carrier was interfered with because the counterbalanced weights shifted the center of gravity in an axial direction to one side or the other of a central position resulting in vibration despite perfect balancing about the axis. By placing the counterbalances in threaded bores as claimed, after balancing about the axis is completed, proper distribution of weight in an axial direction may be obtained without affecting the first balance, so as to produce accurate dynamic balancing and freedom from vibration.

In the operation of cutoffs of the type having rotating disk knives, mounted on rotating carriers, it has been difficult to avoid undue wear and at the same time insure against leaking of oil onto the cigarette rod. The greater the speed, the greater the centrifugal and other forces tending to cause oil to seep by the necessary driving fits at the knife spindle and about the carrier shaft. Also at high speeds dry, greased gears and bearings have been inadequate and an oil bath has been found desirable for satisfactory operation. A fully enclosed oil tight carrier head has been provided and it has been part of the invention to circumvent or eliminate each source of oil leakage.

Figure 2A:
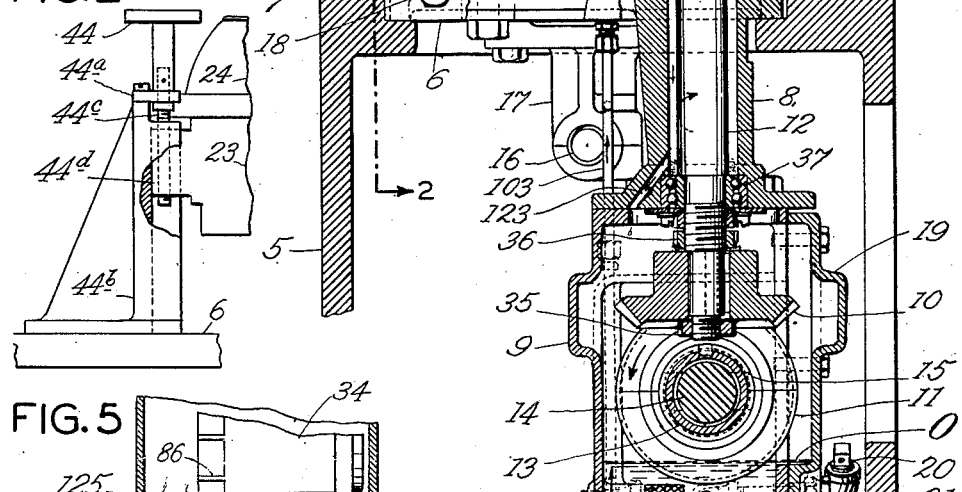

Thus as shown in detail in Fig. 2B, the spindle has an enlarged hollow portion 81 within the substantially oil tight enclosure 34 of sufficient size to provide a rugged bearing. A reduced portion 81a projects through the enclosure and carries the knife 88. As a result of this reduction in size of the projecting portion, the opening through which said portion passes is above the oil level when a substantial oil bath is present in the carrier, a condition difficult to attain with full size bearings if the spindle was of the same diameter throughout. Also with the reduced projecting portion, centrifugal force, it is believed, tends to reduce the tendency of surplus oil to seep out along the spindle.

On the spindle shaft is a spiral groove having an inward inclination counter to the direction of movement of the spindle such that it tends to screw in and in that way to pump surplus oil back into the enclosure or casing 34. The surplus oil thus returned is permitted to pass through openings 81b in the shoulder portion of the spindle and then out by centrifugal force to the bearings through openings 81b in the bearing wall of the spindle. Any oil seeping past the interengaging surfaces of 32 and 33 and past packing 97 is caught by cups 33a (Fig. 2).

In connection with the guide plates 67, it should be observed that as the knife approaches the rod as shown in Fig. 1, a considerable depth of the blade is guided by the plates, the plates bearing on the body portion of the blade at points back of the edge as the edge engages the cigarette rod. The importance of this arrangement lies in the fact that at high speeds the thin blade catches the air and flutters, resulting in the edge hitting to one side of the narrow space between ledger surfaces of 66 which fluttering is greatest near the edge. The arrangement described guides the blade despite flutterings into the ledger space and steadies the body portion back of the edge as its edge goes through the rod, resulting in smooth cutting. This arrangement has also greatly reduced the number of broken blades.

What is claimed is:

1. In a cutoff for cigarette machines, the combination with a ledger plate for guiding a continuously moving cigarette rod, of a cutoff blade, a knife carrier on which said blade is supported, means mounting said carrier for rotation about an axis oblique to the path of the cigarette rod to cause the blade edge to follow the movement of the rod, driving means for said carrier, substantially oil tight enclosure for said driving means, said driving means and said enclosure being each divided into two parts, a relatively stationary part and a movable part, said carrier being mounted on the movable part of said enclosure for movement therewith, means for raising and lowering said movable part relative to said stationary enclosure part to move the knife toward or away from the cigarette rod, and an oil tight connection between the movable and stationary enclosure parts, said driving means including a main drive shaft, a plurality of intermediate shafts, including one fast to said carrier, gear connections between each of said shafts consisting solely of pairs of bevel gears of which one gear of each pair is adjustable toward the other to eliminate short and long cigarettes due to backlash.

2. In a cigarette cutoff, the combination with a ledger plate for guiding a continuously moving cigarette rod, of a cutoff blade, a knife carrier on which said blade is mounted rotatable in a plane of rotation oblique to the rod to cause the blade edge to follow the movement of the rod as the edge passes through it, a head on which said carrier is mounted, means in said head for driving said carrier, including a drive shaft extending into said head, and a driven shaft connected to said carrier, a sliding connection between said driving and driven shafts to permit movement of the head relative to the driving shaft toward and away from the rod during driving, and mechanism for imparting said movement to the head during operation of the cutoff to compensate for knife wear without stopping the cutoff.

3. In a cigarette cutoff, the combination with a ledger plate for guiding a continuously moving cigarette rod, of a cutoff blade, a knife carrier on which said blade is mounted rotatable in a plane of rotation oblique to the rod to cause the blade edge to follow the movement of the rod as the edge passes through it, a head on which said carrier is mounted, means in said head for driving said carrier, including a drive shaft extending into said head, and a driven shaft connected to said carrier, a sliding connection between said driving and driven shafts to permit movement of the head relative to the driving shaft toward and away from the rod during driving, and mechanism for imparting said movement to the head during operation of the cutoff to compensate for knife wear without stopping the cutoff, said mechanism including hand screw means connected to said head to gradually move the head when the screw is manually rotated.

4. In a cutoff for cigarette machines, the combination with a ledger tube for guiding a continuous cigarette rod, of a carrier rotating on an axis oblique to the rod, a knife carried by said carrier for coacting with said tube to cut off cigarettes, a main drive shaft running horizontally lengthwise of the cigarette machine and driving means driving said carrier from said main drive shaft consisting of shafting and gears, said gears consisting solely of coacting pairs of bevel gears, one gear of each pair being adjustably mounted for movement toward the other gear of the pair to eliminate short and long cigarettes by eliminating backlash between the carrier and the main drive shaft.

5. In a cutoff for cigarette machines, the combination with a ledger tube for guiding a continuous cigarette rod, of a carrier rotating on an axis oblique to the rod, a knife carried by said carrier for coacting with said tube to cut off cigarettes, a main drive shaft running horizontally lengthwise of the cigarette machine and driving means driving said carrier from said main drive shaft consisting of shafting and gears, said gears consisting solely of coacting pairs of bevel gears, one gear of each pair being adjustably mounted for movement toward the other gear of the pair to eliminate short and long cigarettes by eliminating backlash between the carrier and the main drive shaft, a spindle on said carrier on which said knife is mounted, and means for rotating said spindle during rotation of the carrier.

6. In a cutoff for cigarette machines, the combination with a ledger tube for guiding a continuous cigarette rod, of a carrier rotating on an axis oblique to the rod, a knife carried by said carrier for coacting with said tube to cut off cigarettes, a main drive shaft running horizontally lengthwise of the cigarette machine and driving means driving said carrier from said main drive shaft consisting of shafting and gears, said gears consisting solely of coacting pairs of bevel gears, one gear of each pair being adjustably mounted for movement toward the other gear of the pair to eliminate short and long cigarettes by eliminating backlash between the carrier and the main drive shaft, a spindle on said carrier on which said knife is mounted, and means for rotating said spindle during rotation of the carrier, said means comprising a sun gear relatively stationary with respect to said carrier, and a planet gear on said spindle engaging with said sun gear.

7. In a cigarette cutoff, a rotating carrier, a knife on said carrier and counter-balancing means for said carrier comprising a threaded bore in said carrier, said bore extending in a direction substantially parallel to the axis of the carrier, and a weighty plug threaded in said bore for graduated movement along said bore.

8. In a cigarette cutoff, a rotating carrier, a knife on said carrier and counter-balancing means for said carrier comprising a threaded bore in said carrier, said bore extending in a direction substantially parallel to the axis of the carrier, a weighty plug threaded in said bore for graduated movement along said bore, and a second weighty plug screwed against the first in said bore to lock the same against movement along the bore.

9. In a cigarette cutoff, a rotating carrier, a disk knife, means mounting said disk knife for rotation located near the periphery of the carrier, and counter-balancing means for the knife and its mounting and driving means comprising a counter-weight approximately diametrically opposite to the knife, and means for adjusting said counter-weight in a direction substantially parallel to the axis of the carrier to facilitate balancing the same.

10. In a cigarette cutoff, the combination with a ledger plate, of a rotating carrier, a cutoff knife mounted for rotation relative to said carrier near the periphery of the carrier for orbital motion thereon past said ledger plate, and means for dynamically and statically balancing said carrier comprising counter-balances adjustably mounted on said carrier for movement in a direction generally parallel to the axis of the carrier.

11. In a cutoff for cigarette machines, the combination with a ledger plate, of a rotary knife carrier, a knife mounted on said carrier for movement past said ledger plate, means within the carrier for rotating said knife relative to the carrier including bearings subject to heating, means for oiling said bearings and cooling vanes on the exterior of said carrier for cooling said carrier.

12. In a cutoff for continuous rod cigarette machines, the combination with a ledger tube for guiding the rod, of a rotary knife carrier, and air propelling vanes on said carrier movable past said ledger tube to direct an air current thereon.

13. In a cutoff for continuous rod cigarette machines, the combination with rod guiding means including a ledger plate, of a rotary knife carrier, a knife supported on the carrier for movement past the ledger plate, means for rotating the knife including a knife spindle and bearings therefor on the carrier subject to heating, a hood surrounding the carrier and the means, outlets permitting passage of heated air out of the hood adjacent the rod whereby the heated air in the hood is utilized to prevent condensation of moisture on the guiding means.

14. In a cutoff for continuous rod cigarette machines, the combination with rod guiding means including a ledger plate, of a rotary knife carrier, a knife supported on the carrier for movement past the ledger plate, means for rotating the knife including a knife spindle and bearings therefor on the carrier subject to heating, a hood surrounding the carrier and the means, outlets permitting passage of heated air out of the hood adjacent the rod whereby the heated air in the hood is utilized to prevent condensation of moisture on the guiding means, and air propelling means on the carrier to accelerate movement of the heated air along said guiding means.

15. In a cutoff for continuous rod cigarette machines, the combination with rod guiding means including a ledger plate and a bell mouth, of a rotary knife carrier, a knife supported on the carrier for movement past the ledger plate, means for rotating the knife including a knife spindle and bearings therefor on the carrier subject to heating, a hood surrounding the carrier, the ledger plate and the bell mouth, outlets permitting passage of heated air out of the hood at the bell mouth whereby the heated air in the hood is utilized to prevent condensation of moisture on the ledger plate and the bell mouth.

16. In a cigarette cutoff, the combination with cigarette rod guiding means including a ledger plate, of a knife carrier, a knife supported on said carrier for movement past the ledger plate, said ledger plate consisting of a pair of tube members spaced to permit the knife to pass between them, and a pair of knife guiding elements having guiding surfaces converging toward the space between said plates to guide and steady the knife body as its edge passes into said space.

17. In a cigarette cutoff, the combination with cigarette rod guiding means including a ledger plate, of a knife carrier, a knife supported on said carrier for movement past the ledger plate, said ledger plate consisting of a pair of tube members spaced to permit the knife to pass between them, and a pair of knife guiding elements having guiding surfaces converging toward the space between said plates to guide and steady the knife body as its edge passes into said space, said elements comprising a pair of plates positioned to bear on the blade at a position spaced from the edge of the blade.

18. In a cigarette cutoff, the combination with cigarette rod guiding means including a ledger plate, of a rotary carrier, a knife supported on said carrier for movement past the ledger plate, means for rotating the knife including gearing on the carrier, an oil tight enclosure for said gearing on said carrier, a spindle having a portion within said enclosure and an externally projecting part carrying the blade, a packed opening in said closure through which said externally projecting part passes and a cup on said carrier positioned to intercept any oil thrown toward the cigarette rod, from said opening.

19. In a cigarette cutoff, the combination with cigarette rod guiding means including a ledger plate, of a rotary carrier, a knife supported on said carrier for movement past the ledger plate, means for rotating the knife including gearing on the carrier, an oil tight enclosure for said gearing on said carrier, a spindle having a portion within said enclosure and an externally projecting part carrying the blade, a packed opening in said closure through which said externally projecting part passes and a cup on said carrier positioned to intercept any oil thrown toward the cigarette rod, from said opening, and an oil guiding disk on said spindle part between the knife and the opening for directing any oil on said part toward said cup.

20. In a cigarette cutoff, the combination with cigarette rod guiding means including a ledger plate, of a rotary carrier, a knife supported on said carrier for movement past the ledger plate, means for rotating the knife including planetary gearing on the carrier, a substantially oil tight enclosure for said gearing on said carrier, a spindle having a bearing portion of relatively large circumference within said enclosure and having an externally projecting part of relatively small circumference passing through said enclosure and carrying said blade.

21. In a cigarette cutoff, the combination with a ledger plate, of a rotary carrier, a knife supported on said carrier for movement past the ledger plate, means for rotating the knife including gearing on the carrier, a substantially oil tight enclosure for said gearing on said carrier, a drive shaft passing through an opening in said enclosure and supporting and driving the carrier and an oil catching groove surrounding said opening and facing centrally to catch any oil thrown outwardly from said opening.

22. In a cigarette cutoff, the combination with cigarette rod guiding means including a ledger plate, of a rotary carrier, a knife supported on said carrier for movement past the ledger plate, means for rotating the knife including gearing on the carrier, a substantially oil tight enclosure for said gearing on said carrier, a spindle projecting through said enclosure and carrying said knife on the projecting portion thereof, means cooperating with said casing and the part of the spindle passing through it to force surplus oil back into the enclosure.

23. In a cigarette cutoff, the combination with cigarette rod guiding means including a ledger plate, of a rotary carrier, a knife supported on said carrier for movement past the ledger plate, means for rotating the knife including gearing on the carrier, a substantially oil tight enclosure for said gearing on said carrier, a spindle projecting through said enclosure and carrying said knife on the projecting portion thereof, means cooperating with said casing and the part of the spindle passing through it to force surplus oil back into the enclosure, said means comprising a spiral groove on said spindle part.

24. In a cigarette cutoff, the combination with cigarette rod guiding means including a ledger plate, of a rotary carrier, a knife supported on said carrier for movement past the ledger plate, means for rotating the knife including gearing on the carrier, a substantially oil tight enclosure for said gearing on said carrier, a spindle projecting through said enclosure and carrying said knife on the projecting portion thereof, means cooperating with said casing and the part of the spindle passing through it to force surplus oil back into the enclosure, said spindle having an enlarged bearing portion within the enclosure and the portion projecting through the enclosure being of reduced size, said enlarged portion being hollow and having an opening adjacent to said reduced portion to receive said returned oil, and having an opening in the spindle periphery for discharging oil from the interior of said spindle.

25. In a cigarette cutoff, the combination with a traveling cutoff knife, of a ledger plate co-acting with said knife during the cutting operation, a reciprocating plunger supporting said ledger plate, mechanism for supporting and driving said plunger, a source of supply of oil, means co-acting with said plunger to form a plunger pump receiving oil from said source of supply and directing oil onto said mechanism.

26. In a cigarette cutoff, the combination with a traveling cutoff knife, of a ledger plate co-acting with said knife during the cutting operation, a reciprocating plunger supporting said ledger plate, mechanism for supporting and driving said plunger, a source of supply of oil, means co-acting with said plunger to form a plunger pump receiving oil from said source of supply and directing oil onto said mechanism, said means including a barrel into which an end of said plunger fits.

ELBERON D. SMITH.

Feb. 26, 1935.  E. D. SMITH  1,992,723
CIGARETTE ROD SEALER
Filed May 22, 1934
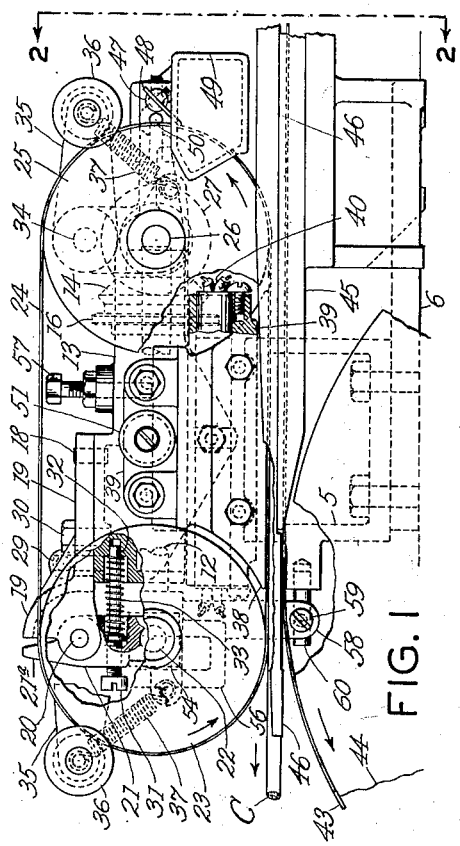
FIG. 1
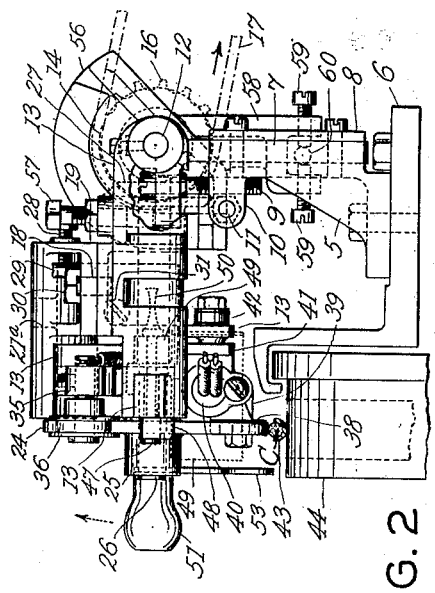
FIG. 2
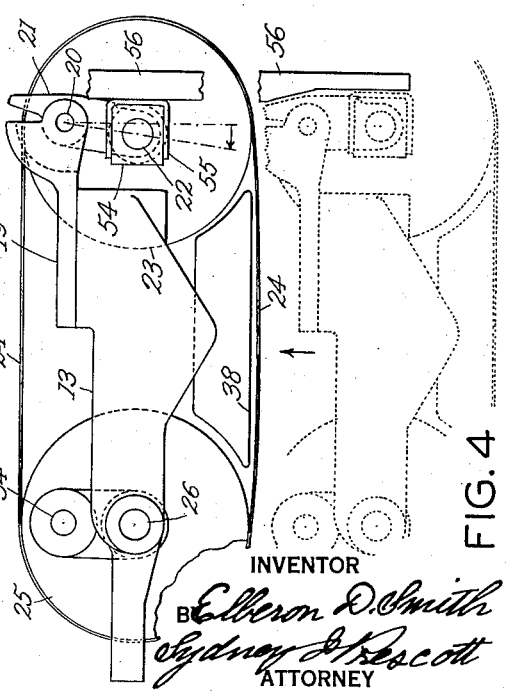
FIG. 3
FIG. 4
INVENTOR
Elberon D. Smith
BY Sydney F. Prescott
ATTORNEY